United States Patent [19]
Kwan

[11] Patent Number: 5,949,279
[45] Date of Patent: Sep. 7, 1999

[54] DEVICES FOR SOURCING CONSTANT SUPPLY CURRENT FROM POWER SUPPLY IN SYSTEM WITH INTEGRATED CIRCUIT HAVING VARIABLE SUPPLY CURRENT REQUIREMENT

[75] Inventor: Phil Kwan, San Jose, Calif.

[73] Assignee: Advanced Micro Devices, Inc., Sunnyvale, Calif.

[21] Appl. No.: 08/856,926

[22] Filed: May 15, 1997

[51] Int. Cl.⁶ .................................................. G05F 3/02
[52] U.S. Cl. ........................ 327/545; 327/543; 327/546
[58] Field of Search ................................ 327/538, 543, 327/545, 546; 323/312, 315

[56] References Cited

U.S. PATENT DOCUMENTS

| | | | |
|---|---|---|---|
| 4,317,054 | 2/1982 | Caruso et al. | 323/313 |
| 5,132,556 | 7/1992 | Cheng | 327/541 |
| 5,519,354 | 5/1996 | Audy | 327/512 |
| 5,619,163 | 4/1997 | Koo | 327/539 |
| 5,646,572 | 7/1997 | Maslied | 327/545 |

*Primary Examiner*—Terry D. Cunningham
*Attorney, Agent, or Firm*—Fliesler, Dubb, Meyer & Lovejoy

[57] ABSTRACT

A low-cost power supply is connected to an object circuit and to a dummy load circuit. The object circuit sends a dummy load control signal to the dummy load which indicates the current requirement of the object. The dummy load sources an amount of current as specified by the dummy load control signal such that the total supply current from the power supply is constant. According to an aspect, the dummy load is implemented as MOS or bipolar transistors. The dummy load control signals are either analog or digital. The object may produce multiple dummy load control signals. The object may consist of multiple integrated circuits wherein each integrated circuit produces one or more dummy load control signals. Smoothing elements may be included in the power supply. In an embodiment, the object is a system of integrated circuits including a microprocessor. The system communicates via a communication bus. The microprocessor fetches instructions over the communication bus. A decoder within the dummy load monitors the communication bus and derives the present current requirement of the object based upon the present and past instructions seen on the communication bus. The decoder maintains state based upon the past instructions seen on the communication bus, and produces a digitally encoded current value for the dummy load. A digital to analog converter converts the digitally encoded current value into an analog current value. The analog current value is input into a dummy load bipolar transistor with a resistor connected to its emitter.

4 Claims, 5 Drawing Sheets

DEVICES FOR SOURCING CONSTANT SUPPLY CURRENT FROM POWER SUPPLY IN SYSTEM WITH INTEGRATED CIRCUIT HAVING VARIABLE SUPPLY CURRENT REQUIREMENT

BACKGROUND OF THE INVENTION

1. Field of the Invention

The present invention relates to the field of power supplies for digital systems having integrated circuit components. Specifically, the present invention relates to power supply regulation for digital systems having complex integrated circuits having variable supply current requirements.

2. Discussion of the Related Art

The continued advances in miniaturization of in CMOS VLSI technology presents heat-dissipation problems for several reasons. In CMOS technology, as the channel length decreases due to feature size shrinkage, the equivalent channel resistance for a transistor that is turned on decreases proportionally, if other parameters are held constant. One of the advantages of CMOS technology over other technologies is in fact power dissipation. In a normal CMOS logic circuit, there is no static power dissipation when the circuit is not changing states. Synchronous logic circuits typically change states at clock edges. Thus, in a typical synchronous CMOS logic circuit, power dissipation is also roughly proportional to the operating clock frequency. As clock frequencies continue to increase, the power consumption increases concurrently. Moreover, smaller feature sizes allow increased circuit density. The large, increasingly complex circuits within a single package can consume significant amounts of power. All power consumed by the integrated circuit is dissipated as heat. This heat must be dissipated in a manner which prevents the temperature of the integrated circuit within acceptable limitations. Excessive heat will destroy the integrated circuit. Because of these sources of increased power consumption in CMOS VLSI circuits, power dissipation problems increasingly challenge the system designers. System designers can provide adequate cooling and thermally conductive heat paths away from the integrated circuit into heat sinks; however, it is nonetheless desirable to reduce unnecessary heat production.

In order to reduce the power consumption of the circuit, VLSI designers have adopted the approaches of reducing the supply voltage and selective powering up and powering down of subcircuits on the same die. Because power is current times voltage, the reduction of the supply voltage proportionately reduces power consumption. Therefore, the reduction of standard supply voltages from 5 volts to 3.3 volts has reduced power consumption by one-third. Further reductions of supply voltage to about 2.5 volts and below is anticipated. (One example of this approach is the Pentium Pro from Intel.) The other approach is to turn off the power to a selected subcircuit within an integrated circuit when it is not in use and to turn the power back on when it is in use.

The use of multiple supply voltages as in the first approach discussed above is known in the art, and was used decades ago in vacuum tube circuits. However, when using selected partial powering of the integrated circuit according to the other approach, the dynamics of supply current requirements present great challenge to system designers. For example, the supply current requirement on the Pentium Pro can shift from 300 mA to a full 12 A in only 500 nanoseconds. Moreover, the "Klamath" (Intel's yet to be introduced microprocessor) requires a 350 nanosecond response time in which to significantly increase or decrease the supply current. As the complexities of programmable circuits such as CPLDs (complex programmable logic devices) and FPGAs (field programmable gate arrays) increases, the same power and heat management issues will occur, and the same approaches are likely to be adopted by designers to cope with these problems.

Presently existing ubiquitous power supplies used in personal computers are not able to change their current outputs within 350 ns while maintaining the proper supply voltage. They cannot increase their current output from a small current to a large current in only 350 ns. In addition, they cannot reduce their current from a large current to a small current in only 350 ns.

As is apparent from the above discussion, a need exists for a power supply system capable of drastically increasing or decreasing its output current within a very small period of time while constantly maintaining the specified output voltage.

SUMMARY OF THE INVENTION

Modern complex microprocessors and programmable logic devices having supply current requirements which can drastically change in very short periods of time. Existing, low-cost power supplies are unable to change their current outputs quickly enough to accommodate the supply current requirements of the object devices. A need exists for systems using low cost power supplies and modern complex object devices in which the supply current requirements of the objects can be met. The value of the present invention is that the dummy load consists of active components for the purpose of keeping up with the fast changing supply current requirements of the object, which is less 350 nanoseconds in the case of the "Klamath".

According to an embodiment of the present invention, a low-cost power supply is connected to the object and to a dummy load circuit. The object sends a dummy load control signal to the dummy load which indicates the current requirement of the object. The dummy load sources an amount of current as specified by the dummy load control signal such that the total supply current from the power supply is constant. Therefore, when the object sources more supply current, the dummy load sources less supply current. Conversely, when the object sources less supply current, the dummy load sources more supply current.

According to an aspect of the present invention, the dummy load is implemented as MOS or bipolar transistors. According to an embodiment of the present invention, the dummy load control signals are analog, thereby allowing a variable amount of current to be sourced through a single dummy load transistor. According to another embodiment of the present invention, the dummy load control signals are digital, such that each dummy load transistor is capable of sourcing two different levels of current. The two different levels of current can be designed to be zero and the difference between the object's two current requirements, thereby minimizing the constant supply current. The object according to the present invention may produce multiple dummy load control signals. Moreover, the object may consist of multiple integrated circuits, each integrated circuit producing one or more dummy load control signals.

According to another aspect of the present invention, smoothing elements may be included in the power supply. The voltage source is placed in series with an inductor or an inductor in parallel with a resistor to smooth the output current of the power supply. Alternatively, the voltage source is placed in parallel with a capacitor or a capacitor in series with a resistor to smooth the output voltage of the power supply.

In an embodiment of the present invention, the object is a system of integrated circuits including a microprocessor. The system communicates via a communication bus. The microprocessor fetches instructions over the communication bus. The communication bus is the dummy load control signal. A decoder within the dummy load monitors the communication bus and derives the present current requirement of the object based upon the present and past instructions seen on the communication bus. The decoder maintains state based upon the past instructions seen on the communication bus, and produces a digitally encoded current value for the dummy load. A digital to analog converter converts the digitally encoded current value into an analog current value. The analog current value is input into a dummy load bipolar transistor with a resistor connected to its emitter. The dummy load current is then linearly related to the analog current value.

These and other features and advantages of the present invention will be apparent from the Drawings as fully discussed in the Detailed Description of the Invention.

BRIEF DESCRIPTION OF THE DRAWINGS

In the Figures, like elements are identified with like reference numerals.

The Figures are more fully explained in the Detailed Description of the Invention.

DETAILED DESCRIPTION OF THE INVENTION

According to the present invention, a low cost power supply with a dummy load circuit supplies the power to the VLSI Object which has the characteristics of fast change in loading. For example, the Klamath microprocessor requires the power supply to respond in less than 350 nanoseconds. The dummy load in parallel with the VLSI object appears to be a constant load to the power supply. In order to achieve this, the object needs to cooperate with the dummy load. Therefore, the object must to send out one or more signals to tell the dummy load that "I need more current, right away!" This dummy load control signal is labeled "NMC" in the Figures. "NMC" stands for "need more current". The dummy load circuit counter balances the load of the object. This circuitry can be a single transistor or several transistors in parallel depends on the needs of current and the cost and the availability of the transistors.

Figure 1:
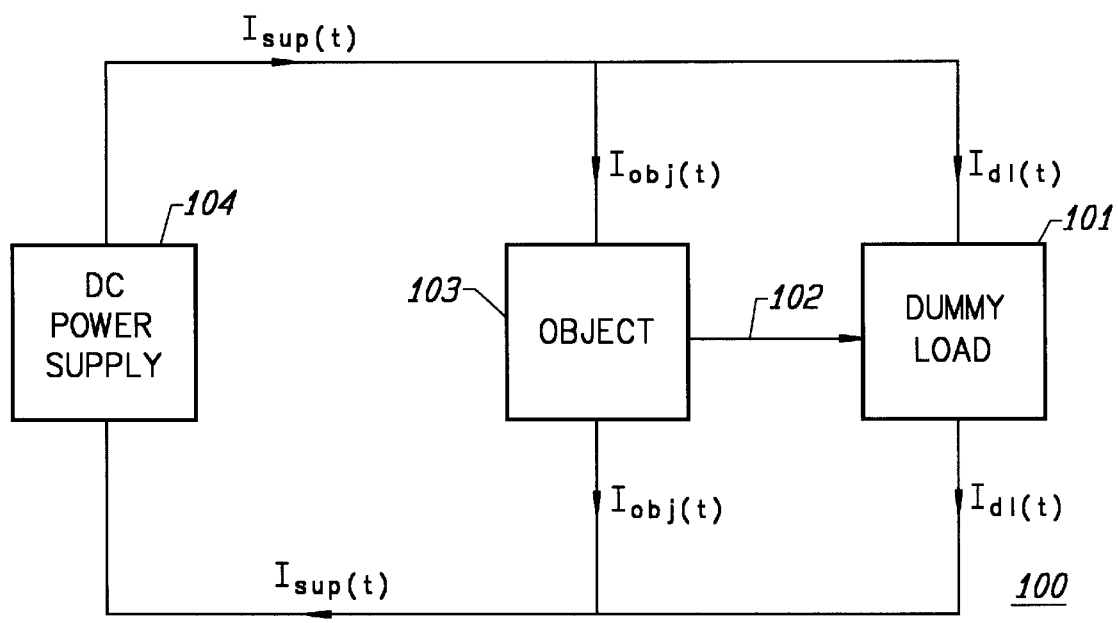
FIG. 1 illustrates an embodiment of a system according to the present invention in which the object and dummy load cooperate to draw a constant amount of supply current Isup(t) from the DC power supply.

The basic elements of an embodiment 100 of the present invention are illustrated in FIG. 1. The object 103 is the integrated circuit having variable current requirements. The current going through the object 103 at time t is shown as Iobj(t). A dummy load circuit 101 has current Idl(t) at time t. A direct current power supply 104 has current Isup(t) at time t.

The currents are related as follows.

$$Isup(t) = Iobj(t) + Idl(t)$$

According to the present invention, the power supply current Isup(t) is maintained at a constant (Isup) for all time t after the system is fully powered up at time t=0.

$$Isup(t) = 0 \text{ for } t < 0$$

$$Isup(t) = Isup \text{ for } t > 0$$

In order for the preceding relationship to hold, then the following relationship must hold.

$$Idl(t) = Isup - Iobj(t) \text{ for } t > 0$$

The object 103 and the dummy load 101 cooperate so that the constant supply current Isup is maintained. In order for the dummy load 101 to cooperate with the variable supply current requirements of the object 103, the object 103 passes a signal 102 to the dummy load 101 from which information regarding present and future supply current Iobj(t) is encoded.

This circuitry shall be turn on or off per NMC. In simple embodiments of the present invention, the NMC signal to be connected to the "base/bases" in the case of bipolar transistors or "gate/gates" in the case of a FETs. This dummy load will be connected in parallel with the object. The dummy load will be off, or not conducting much current, when the object is in full on. The dummy will be on to off-load the unneeded current when the Object is in low power state. Thus, the loading is constant from the view of the power supply.

Figure 2A:
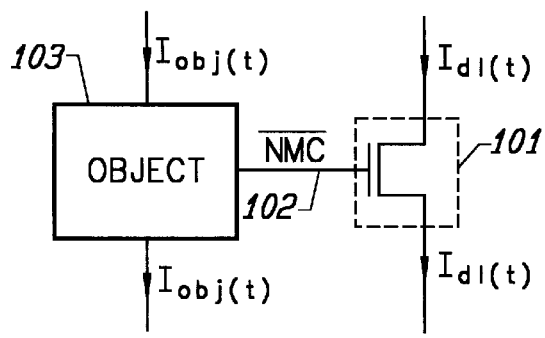
FIG. 2A illustrates an embodiment of the object and dummy load according to the present invention in which the object produces a single analog dummy load control signal and an NMOS transistor acts as the dummy load.
Figure 2B:
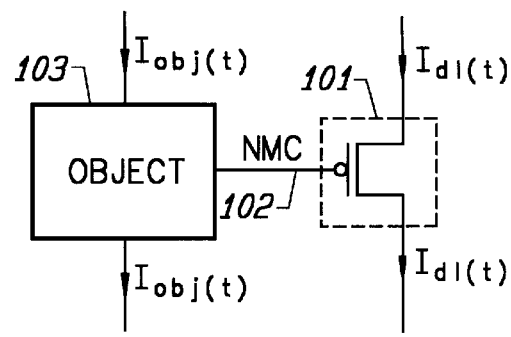
FIG. 2B illustrates an embodiment of the object and dummy load according to the present invention in which the object produces a single analog dummy load control signal and a PMOS transistor acts as the dummy load.

For example, FIGS. 2A through 2F illustrate several simple alternative embodiments of the present invention. In FIG. 2A, the object 103 includes a single output pin which carries the signal 102. The signal 102 is labeled /NMC for the logical inverse of "Need More Current". The dummy load 101 comprises an NMOS transistor. When the /NMC signal is ground, the NMOS dummy load 101 is turned off so that Idl(t) is zero. When the /NMC signal is Vcc, the NMOS dummy load 101 is turned on so that Idl(t) is determined by parameters of the NMOS transistor 101. In FIG. 2B, the dummy load 101 is shown as a PMOS transistor, thereby accommodating a positive polarity signal NMC 102. In these embodiments, the object 103 has two distinct current requirement states; the current through the dummy load Idl(t) when the NMOS transistor 101 is turned on is designed to be the difference between the two distinct current requirement states of the object 101. The saturation equation for transistor 101 is approximately as follows in which Beta is the transistor's gain, Vgs is its gate to source voltage, and Vt is its threshold voltage.

$$Idl=(Beta/2)*(Vgs-Vt)^2$$

This requires careful selection of the transistor 101 because its drain current must equal the difference in current in the object 103 current states.

Alternatively, the above embodiments are well-suited to accommodate an analog signal 102 controlling the drain current Idl(t) through the dummy load transistor. Again, however, the analog signal 102 must be carefully calibrated in accordance with the quadratic relationship between the signal 102 voltage and the dummy load current Idl(t) and in accordance with the specific transistor's parameters which determine Beta and Vt.

Figure 2C:
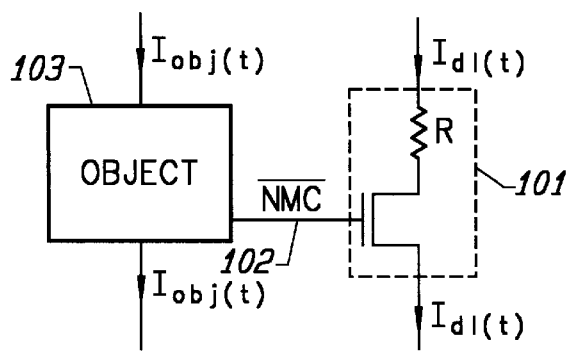
FIG. 2C illustrates an embodiment of the object and dummy load according to the present invention in which the object produces a single digital dummy load control signal for turning on an NMOS transistor thus enabling the dummy load current to flow through a resistor.
Figure 2D:
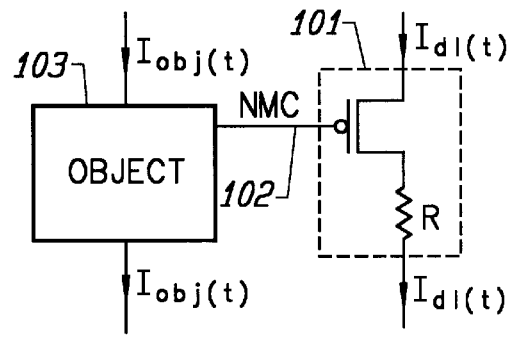
FIG. 2D illustrates an embodiment of the object and dummy load according to the present invention in which the object produces a single digital dummy load control signal for turning on a PMOS transistor thus enabling the dummy load current to flow through a resistor.

FIG. 2C illustrates an embodiment of the dummy load 101 in which an NMOS transistor is in series with a resistor R. In this embodiment, as long as the NMOS transistor is of sufficient size, it will operate primarily in its linear region and will have a very low drain to source voltage. Therefore, the current for the dummy load 101 when turned on by the signal 102 will primarily be a function of the resistance R. Thus, R can be sized so that the current in the dummy load Idl(t) is equal to the difference in the object 103 current states. FIG. 2D illustrates a similar embodiment in which a PMOS transistor is used in the dummy load 101. This allows the use of a positive polarity NMC signal 102. Again, the dummy load current Idl(t) is largely a function of R when NMC 102 is deasserted to ground. The embodiments illustrated in FIGS. 2C and 2D are best suited for use with a digital signal 102, thereby allowing only two dummy load current states, Idl(t)=0 and Idl(t) is approximately Vcc/R.

Figure 2E:
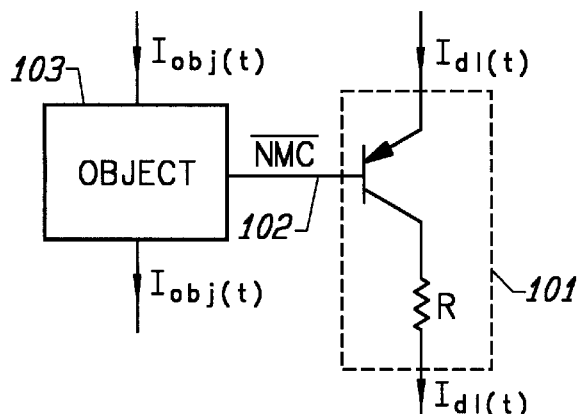
FIG. 2E illustrates an embodiment of the object and dummy load according to the present invention in which the object produces a single analog dummy load control signal for controlling the dummy load current through a PNP bipolar transistor and a resistor.
Figure 2F:
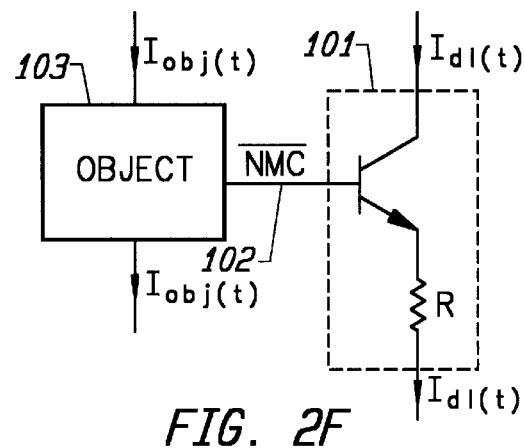
FIG. 2F illustrates an embodiment of the object and dummy load according to the present invention in which the object produces a single analog dummy load control signal for controlling the dummy load current through a NPN bipolar transistor and a resistor.

FIG. 2E illustrates an embodiment of the dummy load 101 in which a PNP bipolar transistor is used in series with a resistor R. FIG. 2F illustrates an embodiment of the dummy load 101 in which an NPN bipolar transistor is used in series with a resistor R. Although both of these embodiments can be used where the transistor is driven into saturation by a digital signal 102, these embodiments are best suited for used when the signal 102 is analog. Because the linear region transfer function for a bipolar transistor is linearly dependent upon the base voltage, the dummy load current Idl(t) can be made linearly dependent upon the voltage at the control signal 102. The dummy load current Idl(t) is approximately (Vb−0.7)/R, where Vb is the base voltage of the transistor and 0.7 is a forward-biased diode drop.

The dummy load resistor and or transistors can easily be mounted on an appropriate heat sink to dissipate the power it consumes.

Figure 3:
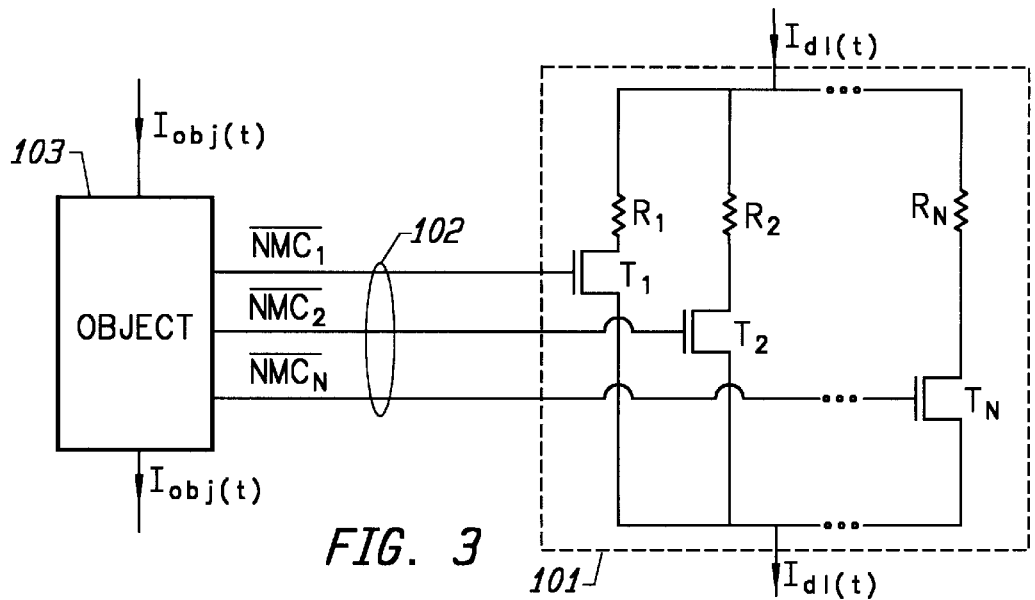
FIG. 3 illustrates an embodiment of the object and dummy load according to the present invention in which the object produces multiple digital dummy load control signals for controlling the dummy load current.

FIG. 3 illustrates an embodiment of the present invention in which the signal 102 consists of multiple digital signals. The object 102 has N separate output pins 102 which supply the control signals indicating the need for current Each output signal 102 may specify the need for a different amount of current, and all the control signals 102 may change independent of one another. The resistor values R1 through RN are chosen to match the requirements of the object 103. This embodiment contemplates an object 103 in which N specific subcircuits in the object 103 each supply their own separate /NMC signal 102 to the dummy load 101.

Certain circuits, such as Pentium Pro or Klamath, have dedicated signals to be used by power supply for various supply requirements.

Figure 4:
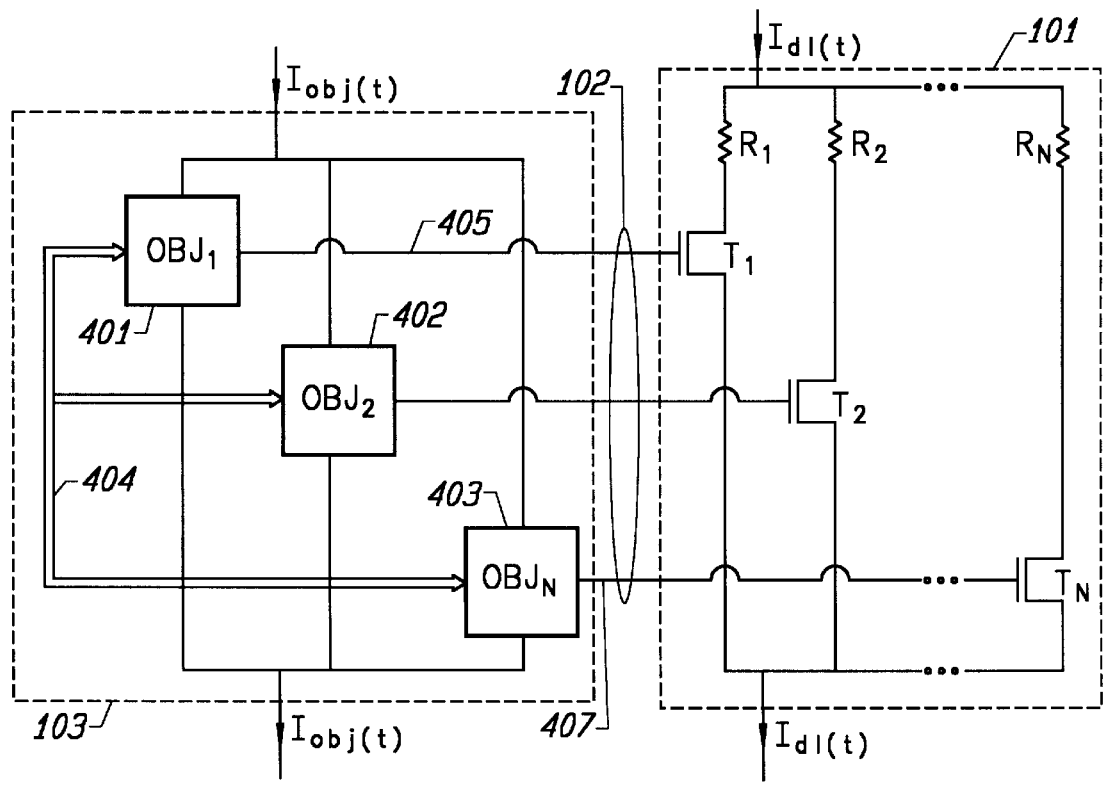
FIG. 4 illustrates an embodiment of the object and dummy load according to the present invention in which the object consists of multiple integrated circuits which each produce a digital dummy load control signal for controlling the dummy load current.

FIG. 4 illustrates an embodiment of the present invention in which the object 103 consists of several separate integrated circuits 401, 402, and 403 which communicate with each other via an internal bus 404. Each separate integrated circuit has its own separate /NMC signal 405, 406, and 407 which together comprise the control signal 102. Each of the resistors R1 through RN can be separately chosen to match the current difference in current requirements for each integrated circuit 401, 402, and 403, respectively.

It is to be understood that the embodiments illustrated in FIGS. 3 and 4 can be combined. For example, integrated circuit 401 in FIG. 4 could alternatively have multiple control signals (not shown) instead of having only a single control signal 405.

Figure 5:
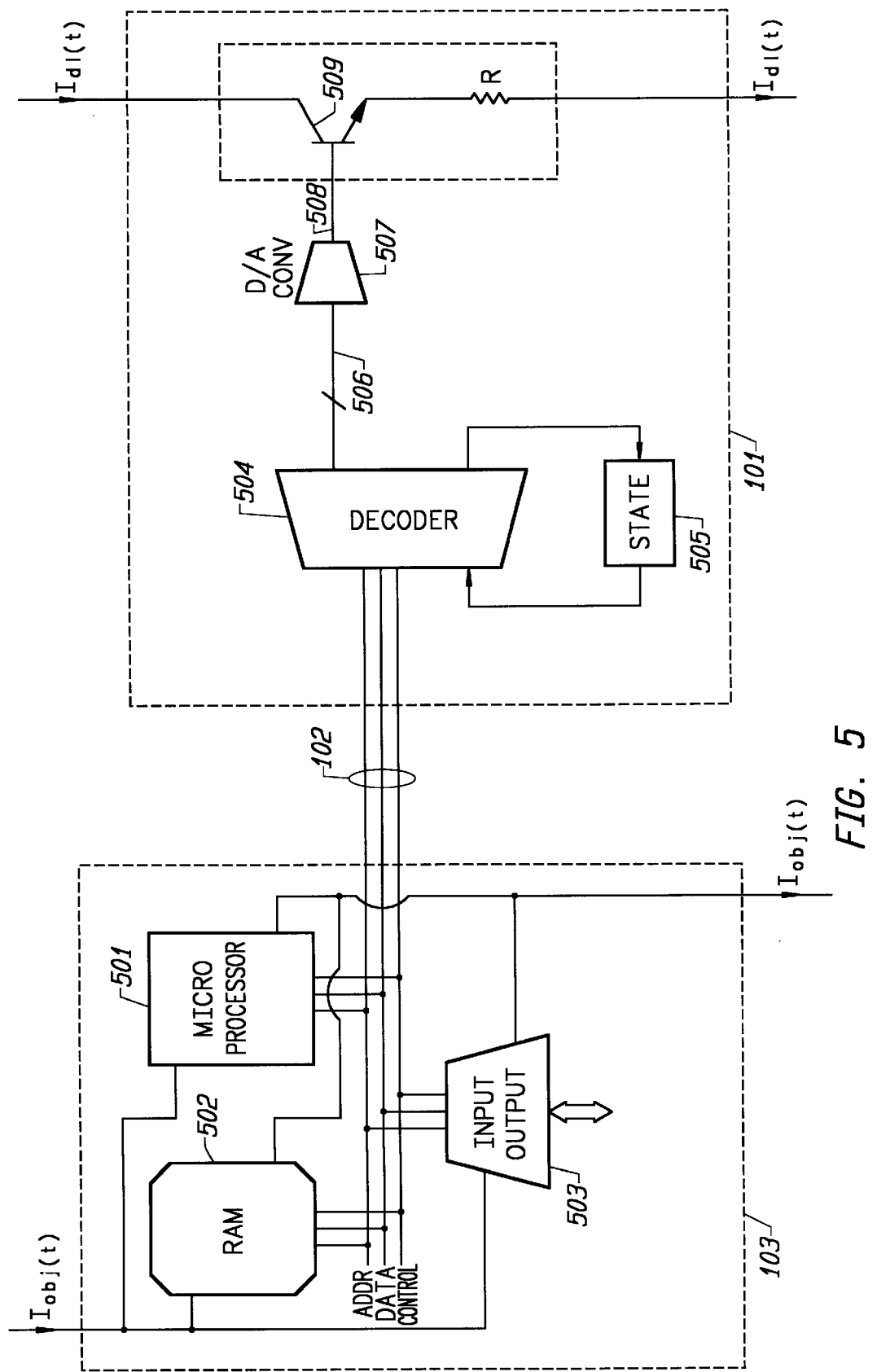
FIG. 5 illustrates an embodiment of the object and dummy load according to the present invention in which the object consists of multiple integrated circuits communicating by a bus which is decoded by the dummy load in order to determine the dummy load current.

FIG. 5 illustrates another embodiment of the present invention in which the object is a computer system having a microprocessor 501, one or more Random Access Memory chips 502, and an input/output interface 503 for interacting with external devices. The object supply current Iobj(t) is the sum of the supply currents of all the component 501, 502, and 503 of the object 103. The object 103 is organized as a computation structure in which the components are connected via a communication bus having multiple address, data, and control lines. The dummy load 101 is connected directly to the communication bus 102. In other words, the control signal 102 for the dummy load 101 is the communication bus itself.

During normal operations of the object 103, the microprocessor 501 fetches instructions from the RAM 502 using the communication bus. A deterministic relationship between the instruction fetched and the current requirements for the object. For example, if a division instruction is fetched, a special hardware unit within the floating point unit will be powered up and utilized to execute this instruction over a period of several clock cycles.

A decoder 504 monitors the activity of the object by monitoring the instructions which the microprocessor has fetched. The decoder 504 is a combinatorial logic circuit which can be implemented as a programming logic device or the like. Some of the outputs of the decoder are input into a state variable register 505. The state variable register 505 is desirable because some instructions do not begin to execute for several clock cycles until after they are fetched, and some instructions require several cycles to execute; therefore, the supply current requirement Iobj(t) for the object 103 is a function of the past and present contents of the communication bus. The digital dummy load current value 506 is output from the decoder and fed to a digital to analog converter 507. The digital to analog converter 507 translates the digital dummy load current value 506 into an analog dummy load bias 508 voltage which biases the bipolar transistor 509 the correct amount to create the correct dummy load current Idl(t).

A decoder suitable for use in a two-current-state embodiment of the present invention can be implemented with an integrated circuit such as 22V10 from Vantis/AMD. The decoder extracts a signal from the bus of the object which signifies "Need more Current" or NMC.

FIGS. 6A through 6D illustrate four alternative embodiments for the power supply 104 according to the present invention. A direct current voltage source 601 is the central element to the power supply 104. The direct current voltage source 601 can be of any type known in the art. For example, a battery, an alternating current to direct current transformer, a direct current to direct current voltage transformer, or a generator. Each of the four embodiments illustrated in FIGS. 6A through 6D also include a smoothing circuit 602, 603, 604, and 605.

An inductor can be connected in serial with the parallel pair of the object and the dummy load to ensure the smooth transition of the load. The inductor maintains the currents during transition of current from the object to the dummy load, or from the dummy load to the object.

Figure 6A:
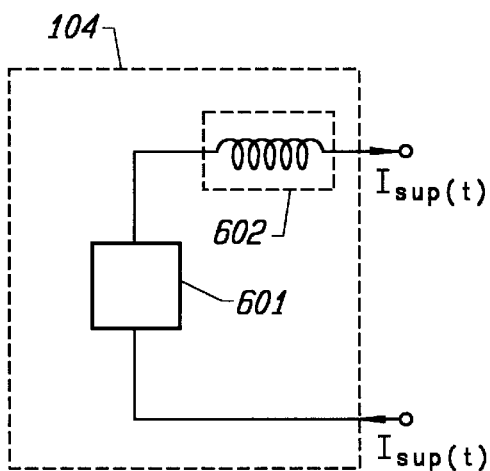
FIG. 6A illustrates an embodiment of the DC power supply for use in a system according to the present invention in which an inductor acts as a supply current smoothing element.
Figure 6B:
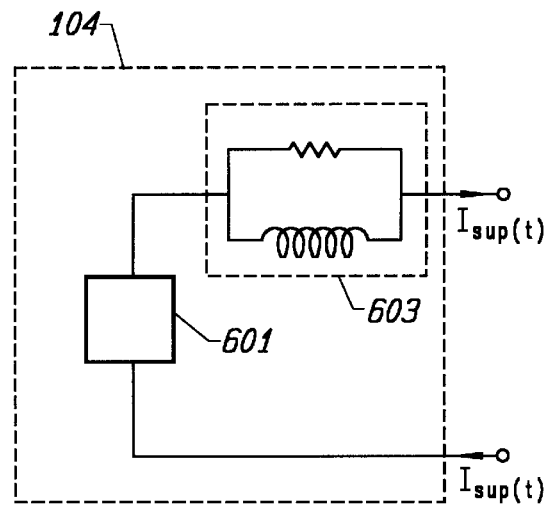
FIG. 6B illustrates an embodiment of the DC power supply for use in a system according to the present invention in which an inductor and resistor act as damped smoothing elements for the supply current.
Figure 6C:
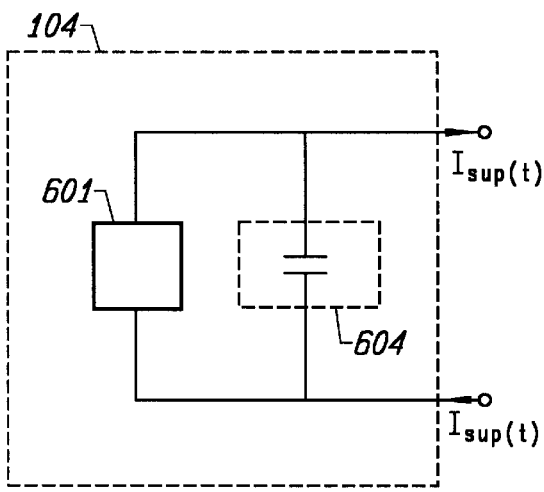
FIG. 6C illustrates an embodiment of the DC power supply for use in a system according to the present invention in which a capacitor acts as a supply voltage smoothing element.
Figure 6D:
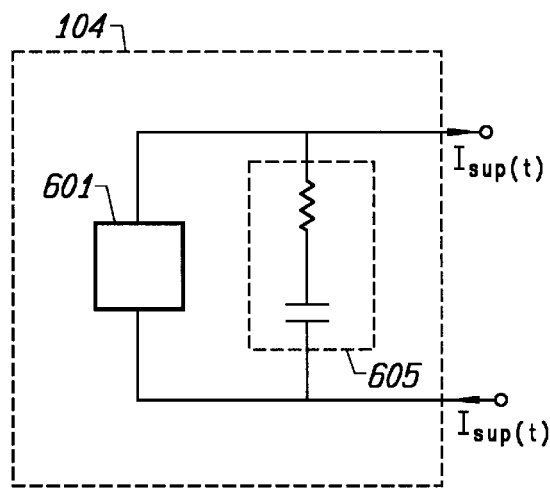
FIG. 6D illustrates an embodiment of the DC power supply for use in a system according to the present invention in which a capacitor and a resistor act as damped smoothing elements for the supply voltage.

FIG. 6A shows an inductor 602 as the smoothing circuit in series with the DC voltage source 601. The inductor 602 helps to maintain a constant output current Isup(t) from the power supply 104. FIG. 6B shows an inductor and resistor in parallel 603 as the smoothing circuit in series with the DC voltage source 601. The resistor and inductor 603 provide current damping to any oscillations which exist on the output of the power supply 104. FIG. 6C shows a capacitor 604 as the smoothing circuit in parallel with the DC voltage source 601. The capacitor 604 helps to maintain a constant output voltage from the power supply 104. FIG. 6D shows a capacitor and resistor in series 605 as the smoothing circuit in parallel with the DC voltage source 601. The resistor and capacitor 605 provide voltage damping to any oscillations which exist on the output of the power supply 104.

While the present invention has been described with reference to its alternative embodiments, those embodiments are offered by way of example, not by way of limitation. Those of ordinary skill in the art will be enabled by this disclosure to add to or modify the embodiments of the present invention in various obvious ways. Accordingly, such modifications and additions are deemed to lie within the spirit and scope of the invention as set out in the appended claims.

What is claimed is:

1. An electronic device that consumes a constant supply current, comprising:
   an object having an object communication bus for fetching instructions; and
   a dummy load coupled to the object communication bus, wherein the dummy load sources a dummy load current corresponding to the instruction fetched on the object communication bus;
   wherein the dummy load comprises:
      a decoder having the object communication bus as input and having a digitally encoded current requirement as output.

2. An electronic device that consumes a constant supply current, comprising:
   an object having an object communication bus for fetching instructions; and
   a dummy load coupled to the object communication bus, wherein the dummy load sources a dummy load current corresponding to the instruction fetched on the object communication bus;
   wherein the object comprises:
      a microprocessor coupled to the object communication bus; and
      a program memory coupled to the object communication bus for storing instructions and data; and
   wherein the dummy load comprises:
      a digital to analog converter having the digitally encoded current requirement as input and producing a continuous analog current requirement signal as output; and
      a dummy load bipolar transistor having a base coupled to the continuous analog current requirement signal, and having a collector and an emitter.

3. An electronic device as in claim 2, wherein the dummy load further comprises:
   a resistor that couples the emitter of the dummy load transistor to a ground supply node.

4. An electronic device as in claim 1, wherein the dummy load further comprises:
   a state variable register coupled to the decoder, such that state variable decoder outputs are inputs to the state variable register, and state variable decoder inputs are outputs of the state variable register.

* * * * *